United States Patent [19]

Hossack

[11] Patent Number: 4,765,633
[45] Date of Patent: Aug. 23, 1988

[54] GASKET MANUFACTURE

[75] Inventor: David J. Hossack, Windsor, United Kingdom

[73] Assignee: Payen International Limited, Berkshire, England

[21] Appl. No.: 27,320

[22] Filed: Mar. 18, 1987

[30] Foreign Application Priority Data

Mar. 21, 1986 [GB] United Kingdom ............... 8607065

[51] Int. Cl.$^4$ ..................... B21D 39/00; B21D 39/06; F16J 15/06; F16J 15/12
[52] U.S. Cl. ...................................... 277/166; 29/464; 29/505; 29/525.1; 277/1; 277/234; 277/235 B
[58] Field of Search ............... 277/234, 235 B, 235 R, 277/166, 1; 29/464, 505, 526 R

[56] References Cited

U.S. PATENT DOCUMENTS

| 2,395,243 | 2/1946 | Aukers | 277/235 B |
| 2,681,241 | 6/1954 | Aukers | 277/234 X |
| 3,151,209 | 9/1964 | D'Ascoli et al. | 277/166 X |
| 3,811,689 | 5/1974 | Farnam | 277/166 |
| 3,889,961 | 6/1975 | Farnam | 277/166 |
| 3,939,892 | 2/1976 | Farnam et al. | 277/166 X |
| 4,072,316 | 2/1978 | Decker et al. | 277/166 X |
| 4,094,520 | 6/1978 | Ng et al. | 277/166 |

FOREIGN PATENT DOCUMENTS 2816383 10/1979 Fed. Rep. of Germany ... 277/235 B
3245383 6/1984 Fed. Rep. of Germany ... 277/235 B Primary Examiner—Allan N. Shoap
Attorney, Agent, or Firm—Nixon & Vanderhye

[57] ABSTRACT

In a gasket construction including rubber grommets or inserts for certain passageways through the gasket, the grommets are moulded integrally with a thin connecting web. The grommets are installed together with the web, which is non-functional in that its effect on sealing performance of the gasket is minimal.

4 Claims, 1 Drawing Sheet

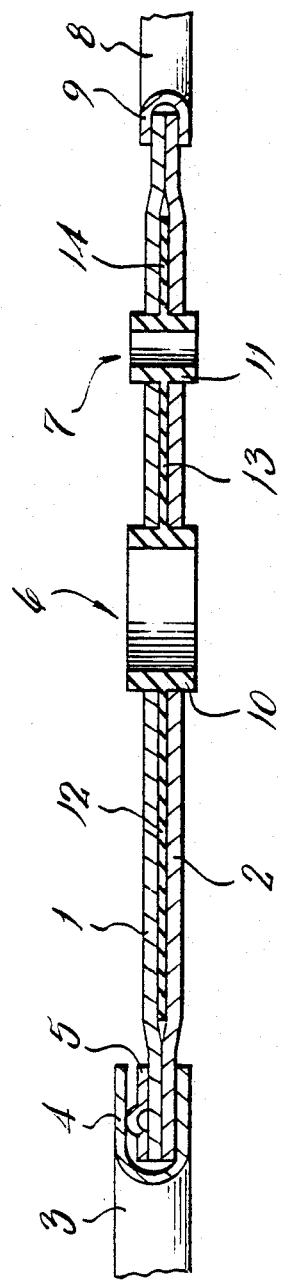

GASKET MANUFACTURE

This invention relates to gaskets of the kind comprising an essentially solid sheet metal main body portion, or core, into which are fitted eyelets to seal around the margins of various apertures defined in the core; the core is usually made of two separate, superposed metal layers or sheets fastened together.

The eyelets commonly used are typically also of metal for sealing high temperatures and pressures such as are encountered in the combustion chambers of internal combustion engines. The same gasket, however, may also have water and/or oil passageways through it and for sealing these it will generally be necessary to use a different type of seal, typically of rubber. It is now common practice to apply such rubber seals by printing them onto each side of the gasket. This calls for precision printing and control. It is also possible to provide the rubber seals as inserts, in the form of grommets or bushes which are fitted manually into apertures in the gasket, after fitting the metal eyelets which serve to hold the gasket core sheets together. Such grommets or bushes will herein be referred to as "grommets", for convenience. This invention is particularly concerned with such grommets and with their installation.

Manual installation of such secondary sealing grommets is not always reliable, especially at high, semi-automated production rates. The omission of even a single grommet can render the product useless. It is an object of the present invention to minimize the risk of such omission.

According to the present invention, at least some of the grommets required for a particular gasket are moulded integrally with a thin connecting web of polymeric material, the configuration of which is such that all of the grommets connected by it are so disposed relative to one another that they can be installed into the gasket in a single operation without rupturing the web.

Preferably all the grommets for a particular gasket are moulded together and thereafter incorporated into the gasket along with their connecting web, the latter being sandwiched between two metal plates which constitute the gasket core, or main body portion, prior to the fitting of metal eyelets into other gasket apertures, to hold the assembly together. The connecting web is thus a non-functional component of the finished gasket, because its contribution to the sealing performance is minimal. No adhesive is required to install the web, as would be required for a conventional laminate of gasket material.

"Polymeric material" in this present context includes any suitable resilient material, whether a conventional rubber, or a plastics material having sufficient resilience to act as a seal.

Because all the grommets, (or at least some of them), are moulded integrally with the connecting web, it is virtually impossible that any one seal can be omitted or wrongly located during gasket assembly.

Furthermore, the presence of the web ensures easy-/accurate location of the grommets, particularly under automatic or semi-automatic assembly conditions. Because moulding lends itself to making grommets of several different sizes/thicknesses in a single operation it is no longer necessary to stock a range of individual grommets of different sizes in boxes at the installation-/assembly point. The risk of an operative accidentally using the wrong size of grommet is therefore eliminated.

Additionally, the presence of the connecting web in the finished gasket assembly may to some extent reduce lateral spreading of the grommets under pressure, although as stated earlier, it is not intended to be a functional part of the finished product.

The grommets and their connecting web may be moulded in continuous sheet form, enabling the latter to be slit into sections, each of which contains all of the grommets for a particular gasket. However, some gasket constructions may require the use of more than one such section, according to size and configuration of the end product.

In order that the invention be better understood one embodiment of it will now be described by way of example with reference to the accompanying FIGURE. For ease of understanding the FIGURE is not to scale, the thicknesses of the component parts have been increased to make the constructional details more clear. As clearly shown in the FIGURE, however, the connecting web is thinner than either of the metal layers. In the FIGURE, superposed metal sheets 1, 2 extend over the opposed faces of a gasket. The latter is only shown in part; it has a cylinder bore aperture 3, bonded by a metal eyelet, 4 and a shim 5. It also has coolant passageways, 6 and 7 and a stud bolt hole aperture 8, the latter being bonded by another eyelet, 9.

The two coolant passageways 6 and 7 have rubber grommets, 10 and 11 respectively, of different sizes, extending through the passageways. These grommets are to provide seals around the apertures 6 and 7 in use in an automotive cylinder head.

The grommets (inserts) are integral with connecting web portions 12, 13, 14, having been moulded integrally with the latter.

What is claimed is:

1. A gasket construction comprising a main body portion formed of two superposed metal layers secured together at a plurality of locations; a plurality of apertures formed in said main body portion, said apertures fitted with resilient, flexible grommets formed of polymeric material, said grommets extending through said apertures for sealing around said apertures on opposite sides of said main body portion; at least some of said grommets being integrally formed with, and interconnected by, a web sandwiched between said metal layers, said web being thinner than either of said metal layers, and wherein said grommets are so disposed in said web relative to one another that they can be installed within the gasket main body portion in a single operation without rupturing the web.

2. A gasket construction as defined in claim 1 wherein said superposed metal layers are secured by a plurality of eyelets.

3. A method of making a gasket comprising the steps of:
 (a) providing a pair of metal plates formed with a plurality of apertures, said apertures being aligned when said plates are in superposed relationship;
 (b) forming a plurality of grommets formed of polymeric material integral with, and interconnected by, a web of said material, said web being thinner than either of said plates;
 (c) locating said web and said plurality of grommets between said plates, and arranging said plates in superposed relationship, with said grommets extending through said aligned apertures; and
 (d) securing said metal plates together.

4. The method of claim 3 wherein the step of fastening said plates together is accomplished by an eyeletting operation.

* * * * *